United States Patent [19]

Wanie

[11] Patent Number: 4,531,365
[45] Date of Patent: Jul. 30, 1985

[54] NEUTRAL START FOR HYDROSTATIC TRANSMISSION

[75] Inventor: Lee J. Wanie, Horicon, Wis.

[73] Assignee: Deere & Company, Moline, Ill.

[21] Appl. No.: 575,484

[22] Filed: Jan. 31, 1984

Related U.S. Application Data

[63] Continuation of Ser. No. 314,814, Oct. 26, 1981, abandoned.

[51] Int. Cl.³ ............................................... F16D 31/00
[52] U.S. Cl. ........................................ 60/328; 60/399; 60/487; 91/1
[58] Field of Search ................. 60/431, 328, 399, 487, 60/465, 445, 443, 389; 91/1; 92/5; 74/473 R, 567

[56] References Cited

U.S. PATENT DOCUMENTS

| | | | |
|---|---|---|---|
| 3,906,813 | 9/1975 | Webber et al. | 137/636.2 X |
| 4,091,717 | 5/1978 | Bojas et al. | 91/498 |
| 4,211,079 | 7/1980 | Saele et al. | 60/433 |

Primary Examiner—William R. Cline
Assistant Examiner—Randolph A. Smith

[57] ABSTRACT

A hydrostatic transmission including a pump and motor unit wherein the pump unit is displaceable effectuated by an operative member integral to the pump unit. A neutral start switch communicating with a carrying machine is mounted in the pump unit to contact the operative member in a manner causing the neutral start switch to become operative only when the operative member is assuming a neutral position.

1 Claim, 3 Drawing Figures

NEUTRAL START FOR HYDROSTATIC TRANSMISSION

This application is a continuation of application Ser. No. 314,814, filed Oct. 26, 1981 now abandoned.

BACKGROUND OF THE INVENTION

This invention relates to radial piston hydrostatic transmissions and, more particularly, to a means of assuring a neutral transmission setting.

Radial piston hydrostatic transmissions are commonly used in the smaller variety of off-road vehicles such as small tractors. Unlike a conventional gear transmission which is positive engaging, a radial piston hydrostatic transmission is continuously engaged. As a result, the transmission control linkage assembly must be able to position a control ring within the hydrostatic transmission with greater precision in order to achieve a true neutral transmission mode. Such control linkage assemblies require frequent adjustment and are incapable of assuring a neutral transmission mode.

Another problem encountered by radial piston hydrostatic transmission occurs as a result of control ring creep. Once such transmissions are placed in a functional neutral mode, it is not uncommon for the transmission control ring to creep within the slack range of the control linkage assembly. Control ring creep represents the unintended transmission of power.

SUMMARY OF THE INVENTION

It is an objective of the present invention to provide a visual means of determining whether a radial piston hydrostatic transmission is in a neutral mode.

It is a further objective of the present invention to present a means of preventing control ring creep.

A conventional radial piston hydrostatic transmission includes a rotor containing a plurality of radial ball piston. A control ring is pivotably mounted within the transmission's housing around the rotor and ball pistons. A pivot member actuated by a control lever is seated in the control ring responsible for positioning the control ring. A neutral start switch is activated when the control ring enters the neutral region and seat within a concavity in the pivot member when the control ring is in the neutral position. The switch also functions to resist control ring creep.

DETAILED DESCRIPTION OF THE PREFERRED EMBODIMENT

Figure 2:
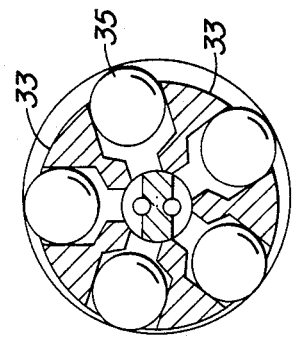
FIG. 2 is a sectioned view of the radial ball fixed displacement piston motor unit.
Figure 1:
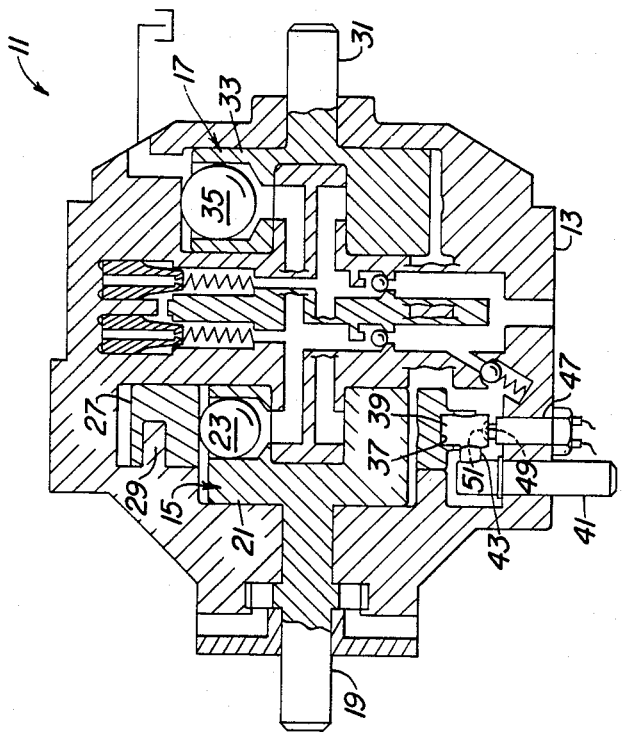
FIG. 1 is a sectioned view of a hydrostatic transmission pump and motor units employing radial ball pistons.
Figure 3:
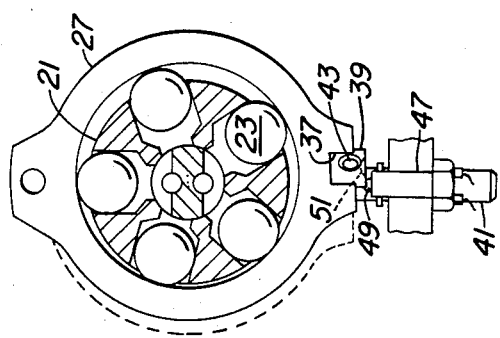
FIG. 3 is a sectioned view of the radial ball piston hydrostatic pump unit with a variably displaceable control ring and control lever.

Referring to FIGS. 1, 2, and 3, a conventional radial piston hydrostatic transmission, generally indicated as 11, includes a housing 13 containing a pump unit 15 and motor unit 17 in fluid communication. The pump unit 15 consists of an input shaft 19 driving a rotor 21 containing a plurality of radial ball pistons 23. A control ring 27 is placed around the rotor 21 and pistons 23 pivotably mounted within the housing by pivot pin 29. The pump unit 15 consists of an output shaft 31 driven by rotor 33 carrying radial ball pistons 35.

The control ring 27 includes a seat 37 occupied by a pivot member 39 in a manner allowing the member 39 to pivot. A portion of a control lever 41 intrudes into the housing and is rotatably mounted therein by any conventional means. The lever 41 has a linking pin 43 fixably mounted thereto by any conventional means extending into the pivot member 39. It is observed that by rotating the control lever 41 the communication between the linking pin 43 and pivot member 39 causes the control ring 27 to pivotally displace about pin 29. A conventional neutral start switch 47 is fixably mounted to the housing 13 to extend within the housing having its contact surface 49 in communication with the pivot member 39. The pivot member 39 has formed therein a concavity 51 which receives the contact surface 49 of the neutral start switch 47 when the control ring is in a neutral position, thereby placing the switch 47 in an operative mode. Should the control ring 27 be in a position other than neutral, the contact surface 49 of switch 47 is in communication with member 39 to place the switch 47 in an inoperative mode. Further benefit is derived by a forced contact between contact surface 49 and pivot member 39 and the release of the forced contact when surface 49 is received by concavity 51 in that when the surface 49 is received by concavity 51 the transmission 11 is held in neutral to prevent transmission creep.

The present invention has been described in its preferred embodiment as it relates to a radial hydrostatic transmission. The full scope of the invention should not be thought as limited by the preferred embodiment and applies to all equivalent embodiments. The full scope of the present invention is defined by the appended claims.

I claim:

1. In a radial piston hydrostatic transmission including a pump and motor unit in fluid communication, said pump unit rotor carrying a plurality of radial piston balls, a control ring pivotal mount in a pump housing around said rotor, a member pivotally received in a seat on said control ring, a control shaft rotatably mounted in said pump housing having a transversely extending linking arm slidably received in said member such that rotation off said control shaft causes said control ring to pivot, wherein the improvement comprises means for detecting a neutral location of said control ring and for providing resistance to creep of said control ring in said neutral location, said means including said member having a concavity form on one surface, and a switch having a contact surface matingly sized to said concavity, said contact surface of said switch to be received in said concavity when said control ring occupies said neutral location.

* * * * *